United States Patent [19]
Solomon

[11] Patent Number: 5,616,059
[45] Date of Patent: Apr. 1, 1997

[54] TAILBUOY WITH SELF-DEPLOYING MAST

[75] Inventor: Frank Solomon, Hillingdon, England

[73] Assignee: Western Atlas International, Inc., Houston, Tex.

[21] Appl. No.: 567,715

[22] Filed: Dec. 5, 1995

[51] Int. Cl.$^6$ ..................................................... B63B 22/00
[52] U.S. Cl. .................................. 441/11; 114/253; 441/6
[58] Field of Search ..................................... 114/242, 244, 114/270, 253; 441/1, 6, 11–20; 343/706, 709, 711, 880, 874; 52/111

[56] References Cited

U.S. PATENT DOCUMENTS

| | | | |
|---|---|---|---|
| H1,051 | 5/1992 | Briguglio | 441/11 |
| 4,228,556 | 10/1980 | Searls | 441/12 |
| 4,890,568 | 1/1990 | Dolengowski | 114/253 |

FOREIGN PATENT DOCUMENTS

WO094000336  1/1994  WIPO ..................... 114/244

*Primary Examiner*—Edwin L. Swinehart
*Attorney, Agent, or Firm*—Charles R. Schweppe

[57] ABSTRACT

The present invention is a floatation apparatus with a self-deploying mast for use in a marine towing operation. The invention includes a mast assembly. The mast assembly comprises a shaft adapted to pivotally mount in a storage position on the floatation apparatus, a pair of masts mounted on the shaft forming a structure with front and back sides and dividing the masts into a top section above the shaft and a bottom section below the shaft, pairs of arms and legs projecting perpendicularly from the front of the top section of the masts and from the back of the bottom section of the masts, respectively, a crosspiece connecting the arms to each other and another crosspiece connecting the legs to each other. The distribution of the weight of the mast assembly results in the mass of the bottom section being greater than the mass of the top section such that when the buoy is placed in the water, the mast assembly pivots to a desired operational position and is held there by the force of the water against the front of the mast assembly. When the floatation system is returned to the deck of the vessel, the mast assembly is pivoted back to its storage position. The floatation apparatus in the preferred embodiment is a tailbuoy.

12 Claims, 5 Drawing Sheets

TAILBUOY WITH SELF-DEPLOYING MAST

BACKGROUND OF THE INVENTION

1. Field of the Invention

The present invention is related to the field of marine towing operations. More specifically, the present invention is related to floatation devices, such as tailbuoys, used to maintain marine cables at desired depths and which have deployable masts to provide improved visual identification and on which transmission antennae are mounted for the communication of positioning information.

2. Description of the Related Art

In the field of marine seismic exploration, it is important to determine the configuration of the rock strata underlying the subsea earth's surface to locate subsurface structures favorable to the accumulation of oil and gas. In marine seismic surveying, this is accomplished by generating acoustic pulses or shock waves with sound sources, such as air guns, and by monitoring the resultant acoustic waves which reflect off the subsea interfaces with acoustic sensors. In a typical marine surveying operation, the seismic sound sources and the acoustic sensors are towed in designated patterns behind a seismic vessel. The basic principles of these surveying operations are well known to those skilled in the art.

As the vessel towing the acoustic sensors moves over the area being surveyed, the seismic sound sources are activated which introduces seismic signals into the body of water. The signals propagate downwards through the water and into the subterranean geological formations. Some of the signals are reflected by the interfaces between adjacent subterranean formations including the interface between the water and the floor of the body of water. The reflected signals travel upwardly through the geological formations and the body of water to the seismic receiver cable which is located near the surface of the body of water. The acoustic sensors or receivers detect the reflected acoustic waves and provide optical and/or electrical signals representative of such acoustic waves. The signals from the acoustic sensors are collected and relayed to apparatus aboard the vessel. These signals then are analyzed to provide information concerning the structure of the subterranean geological formations and possible oil and gas accumulations within the formations. The information typically is processed into display maps which show the thickness and orientation of the various strata underlying the sea bed.

Commonly, an array of seismic acoustic sensors, such as hydrophones, are configured in a seismic cable where the hydrophones are spaced along the length of the seismic cable. This seismic cable typically is called a streamer cable.

To optimally develop 3-D marine surveys, to reduce the number of passes required of the seismic vessel in surveying a specific area and to improve the quality of the resulting geophysical information, multiple streamer cables typically are deployed in a pattern parallel to the centerline of the vessel. The streamer cables are separated from each other by calculated offset distances to provide the desired, spaced parallel pathways which minimize duplicate coverage but are adequate to cover the area to be surveyed. To obtain and maintain the desired lateral distances between adjacent streamer cables throughout the time period during which the seismic vessel is traversing the survey area, the streamer cables are attached at predetermined tow points on the cable to devices referred in the art of seismic exploration as pullavanes or paravanes. The pullavanes are towed to the side of the vessel and provide the means to tow the streamer cables along pathways parallel to but laterally spaced from the pathway of the towing vessel.

Armored, optical-electrical towing cables, referred to in the art as leadin cables, are used to couple the streamer cables to the apparatus on the vessel which includes the power source and the data control system. In conventional towing arrangements, a tow line connects the leadin cable directly to the positioning device, such as a pullavane, which, as noted above, is positioned to the side of the vessel. The leadin cable forms a relatively large-radius loop behind the vessel (or from a boom or outrigger extended sideways from the vessel) to the tow line of the pullavane and then extends behind the pullavane to the point where the leadin cable connects to the streamer cable. Such an arrangement or configuration positions the streamer cable at the desired, controlled lateral offset from the vessel and from the adjacent streamer cables. Other streamer/leadin cable combinations are towed directly behind the vessel without the need for offset-positioning apparatus.

The streamer cable typically is filled with a fluid which acts as a buoyancy material to keep the streamer cable at the desired depth beneath the surface of the water during the surveying operation. Because of the length of the streamer cables (sometimes several miles in length), the streamer cables are in danger of being snagged by other vessels. Therefore, a floatation device, such as a tailbuoy, is attached to the submerged, tail end of the streamer cable to provide means to visibly approximate the location of the end of the streamer cable. The tailbuoy is also quite useful for retrieval operations. If the vessel-end of the marine cable becomes detached from the vessel, the marine cable can be retrieved from the tailbuoy-end of the cable by using the tow line attached to the tailbuoy and the streamer cable.

Additionally, the tailbuoy commonly contains equipment for receiving data from a positioning system, such as the satellite navigation system known as the Global Positioning System (GPS), processing the data and transmitting the tailbuoy's position information to a tracking system on the vessel. Antennae, for receiving the signals from the satellites and for transmitting the processed signals to the vessel, are mounted on masts which extend upward from the tailbuoy to provide as much height as possible to minimize the negative effects of waves and other surface conditions on the signal transmission between the communication equipment on the tailbuoy and the control equipment on the vessel. The tailbuoy's positioning data not only provides a means to physically locate the tailbuoy but can also be used to assist in determining the actual position of the end of the streamer cable. Increased accuracy in the calculated position of end of the streamer cable, and thereby increased accuracy for the positions of the acoustic sensors in the streamer cable, provides for increased precision in correlating the seismic signals received by the acoustic sensors to actual earth formations.

A typical tailbuoy used for relaying position information to the vessel, and without equipment for steering, may be approximately four feet by six feet in size and weigh over 2000 pounds. Because of the bulkiness of such an apparatus, any possible trimming operations, such as positioning the mast into its horizontal storage position and removing the antennae, are done prior to storing the tailbuoy on the vessel. The antennae are reattached and the masts are deployed to their vertical positions for operation as the tailbuoy is hoisted from the deck of the vessel and deployed over the side or rear of the vessel into the water.

One of the problems with the prior art tailbuoys is that the masts on these tailbuoys are deployed to their desired vertical positions after the tailbuoys are deployed from the deck of the vessel. The prior art method involves positioning the tailbuoy over the side or rear of the vessel and then having crew members lean over the side or rear of the vessel to ratchet the masts into their desired vertical, deployed positions. The inherent problems caused by rough seas and crew members unable to maintain their balance while performing this maneuver and the amount of time required for mast operations (ratcheting each mast on each tailbuoy to its desired vertical position prior to starting the surveying operation and then ratcheting each mast back to its storage position after the surveying operation) have focused attention on the need for a safer and quicker method of deploying and deactivating the masts.

SUMMARY OF THE INVENTION

The present invention is a mast assembly for use on a buoy. The mast assembly comprises a frame which is pivotally coupled to the buoy. The weight of the frame is distributed with respect to the pivot axis such that a lower end extends into the water when the buoy is floating on the water. The bottom end of the frame has a surface against which the water exerts a force, as the buoy is towed through the water, which rotates the frame into a desired position. A stop member on the buoy prevents the frame from rotating past the desired position.

Examples of the more important features of the invention thus have been summarized rather broadly so that the following detailed description may be better understood and so that the contributions to the art may be appreciated. There are, of course, additional features of the invention that will be described hereinafter and which will form the subject of the claims appended hereto.

BRIEF DESCRIPTIONS OF THE DRAWINGS

For detailed understanding of the present invention, references should be made to the following detailed description of the preferred embodiment, taken in conjunction with the accompanying drawings, in which the like elements have been given like numerals and wherein.

While the invention will now be described in connection with the preferred embodiment, it is to be understood that the invention is not limited thereto. On the contrary, the invention is intended to cover all alternatives, modifications and equivalents which may be included within the scope of the invention.

DESCRIPTION OF THE PREFERRED EMBODIMENT

Figure 1:
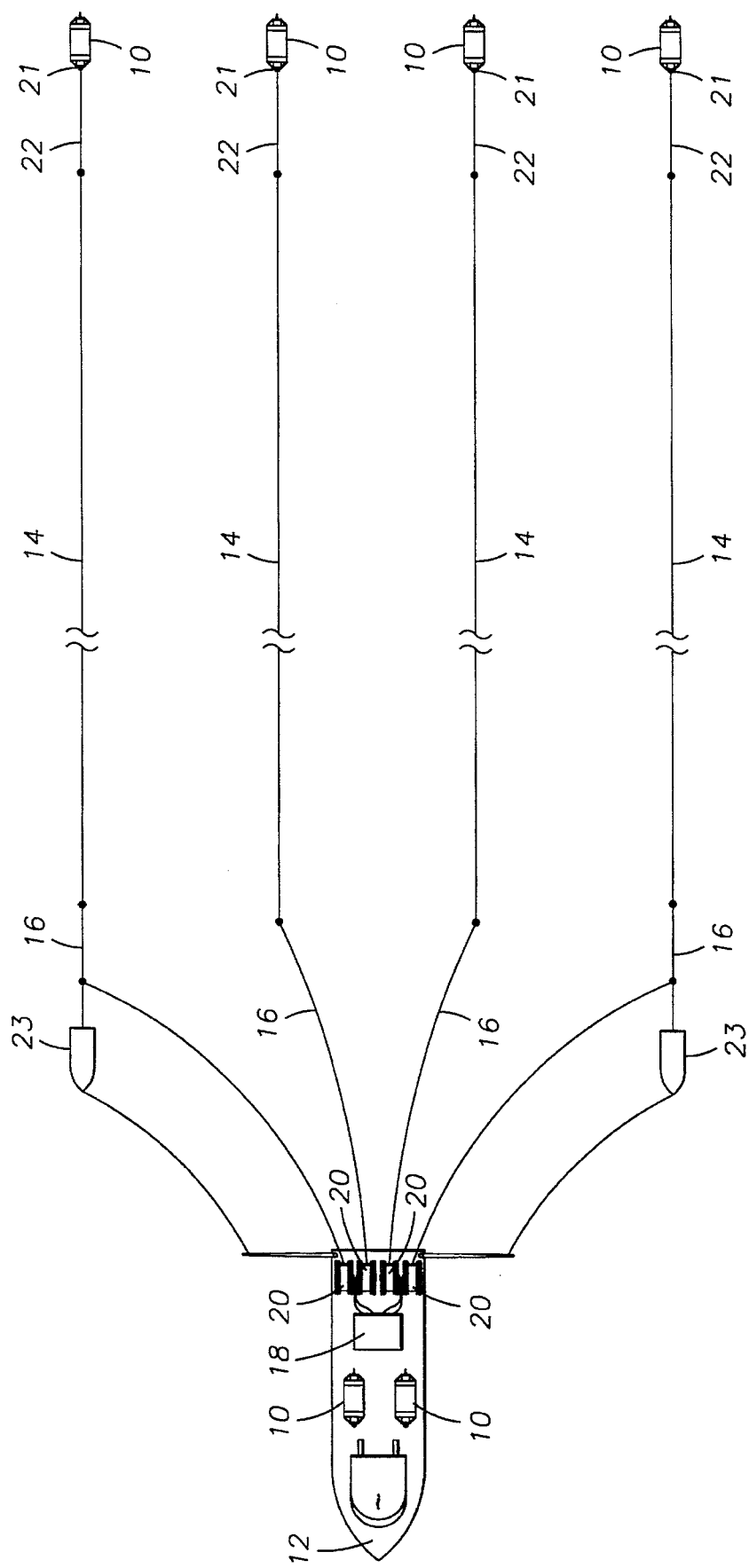
FIG. 1 is a schematic plan view showing the tailbuoy of the present invention being used in a typical marine surveying operation.
Figure 2:
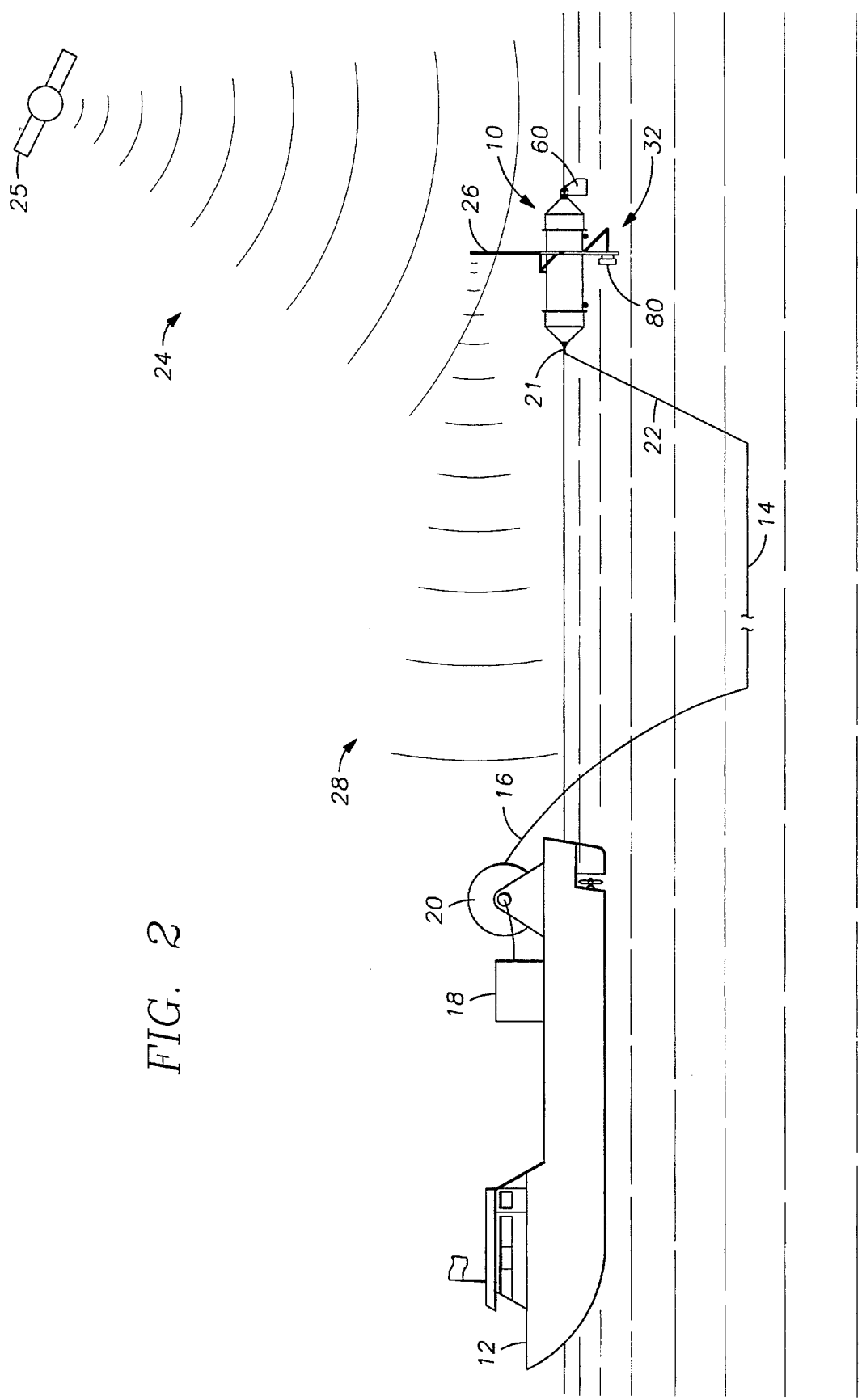
FIG. 2 is a side elevational view of a seismic vessel, streamer cable and tailbuoy of the present invention.
Figure 3:
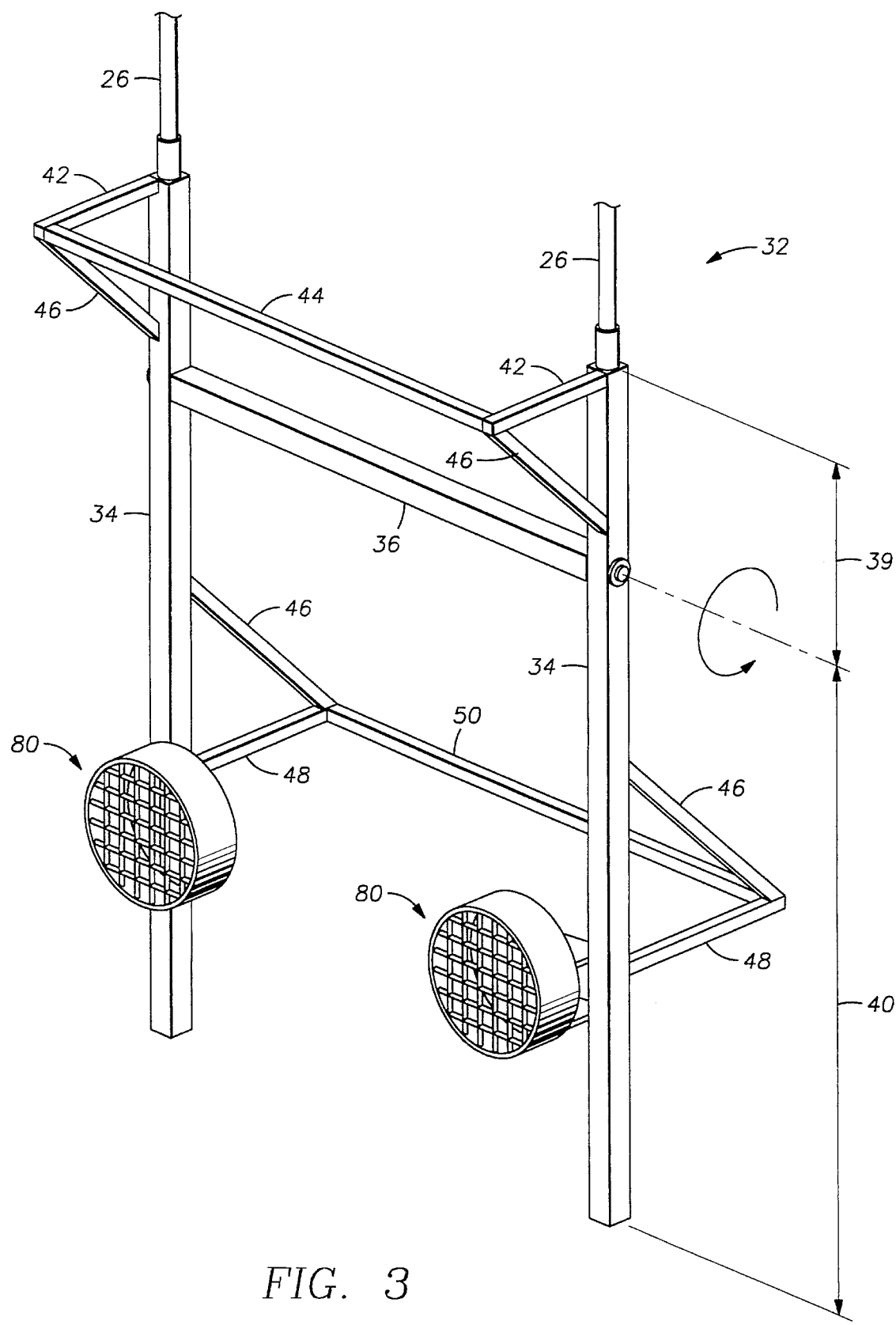
FIG. 3 is a perspective view illustrating the principal components of a mast assembly of the preferred embodiment of the present invention.
Figure 4:
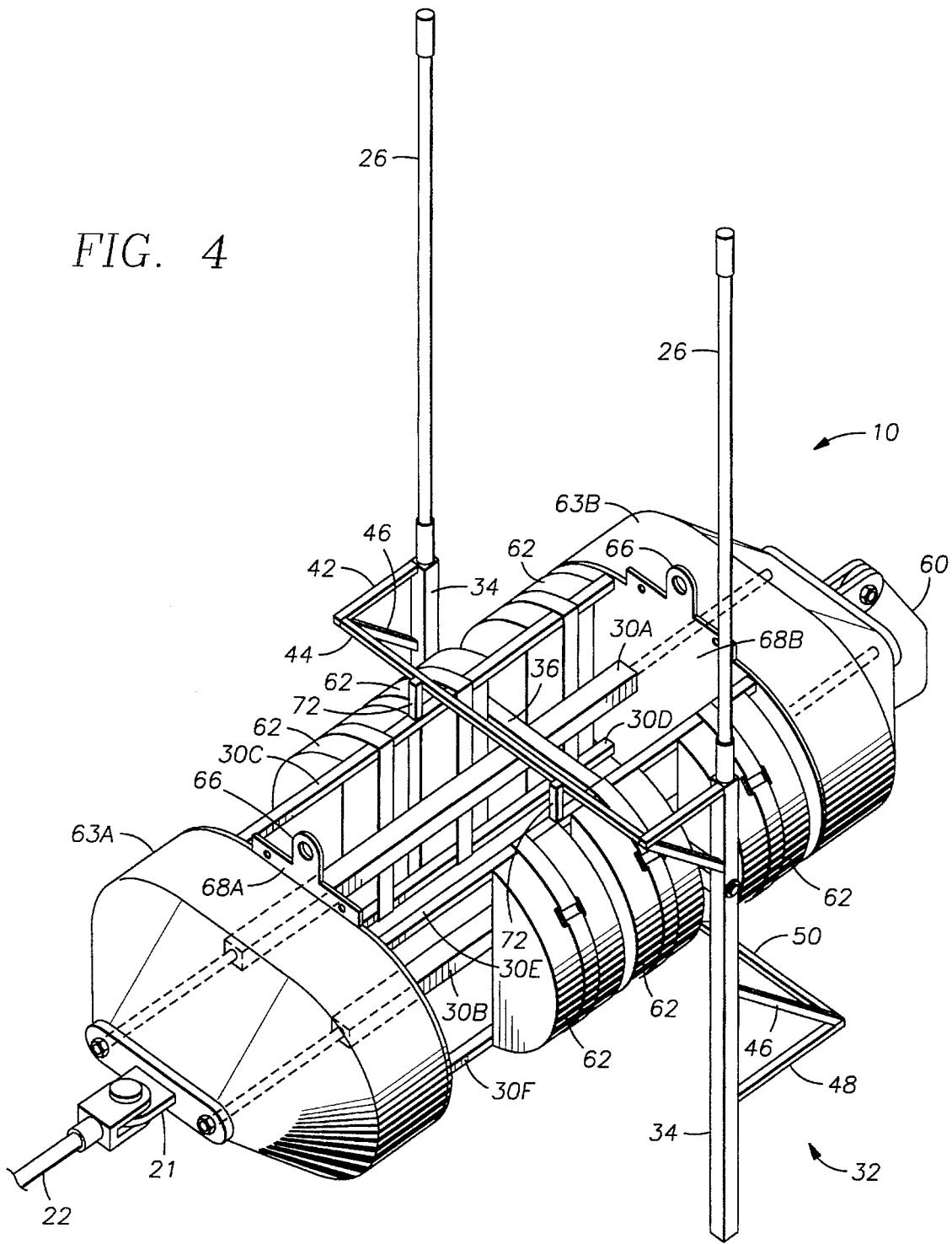
FIG. 4 is a perspective view illustrating the principal components of the preferred embodiment of the tailbuoy of the present invention with the mast assembly in the vertical deployed position.
Figure 5:
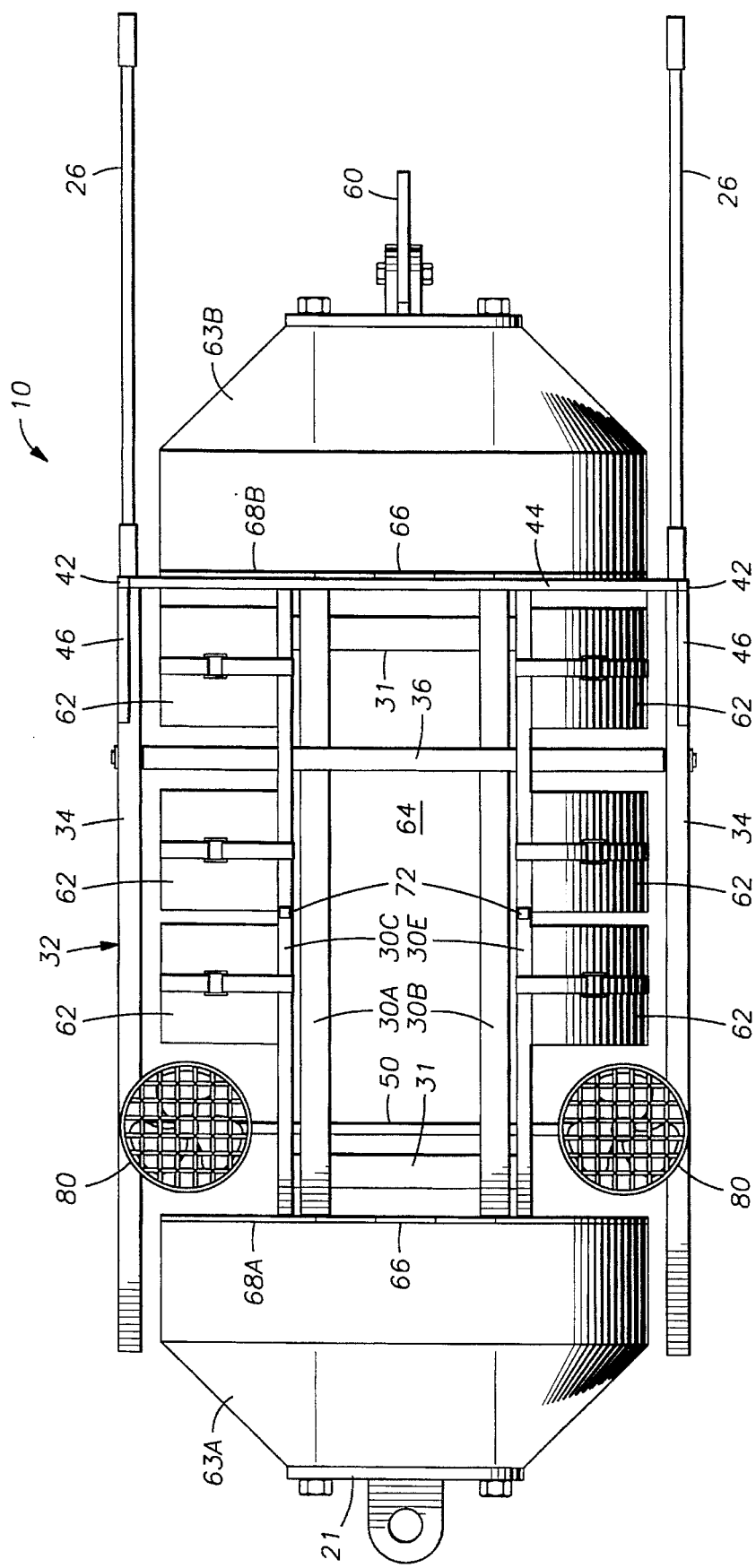
FIG. 5 is a top plan view of the preferred embodiment of the tailbuoy of the present invention with the mast assembly in the horizontal storage position.

The preferred embodiment of the present invention, a self-deploying-mast tailbuoy 10, is illustrated in detail in FIGS. 3, 4 and 5. FIGS. 1 and 2 describe the marine environment in which the invention will be used. FIGS. 1–5 are meant to depict a surveying operation in which the vessel 12 is proceeding in the direction towards the left and is towing tailbuoys 10 at the ends of streamer cables 14.

FIG. 1 illustrates the use of the tailbuoy 10 in a typical marine surveying operation. FIG. 1 is a top view of a seismic vessel 12 towing a typical configuration containing multiple streamer cables 14 (four are shown) with two streamer cables 14 directly behind the vessel 12, one streamer cable 14 offset to the port side of the vessel 12 and one streamer cable 14 offset equidistantly to the starboard side of the vessel 12. This particular configuration is meant by way of example and is not meant to limit the scope of the invention. The streamer cables 14 are connected via leadin cables 16 to a control system 18 on the vessel 12. The streamer cables 14 and the leadin cables 16 are stored on reels 20 on the vessel 12. The tailbuoys 10 are connected to the trailing ends of the streamer cables 14 via tow cables 22. Pullavanes 23 typically are used to position the streamer cables 14 at the desired lateral distances from the centerline of the vessel 12 and from adjacent streamer cables 14.

FIG. 2 illustrates the relative positioning of the vessel 12, the leadin cable 16, the streamer cable 14 and the tailbuoy 10. In marine surveying operations, the streamer cable 14 typically is towed at a depth of about fifty feet to help minimize the negative surface effects. The tailbuoy 10 is connected to the streamer cable 14 by removably attaching one end of the tow cable 22 to the tail end of the streamer cable 14 and the other end of the tow cable 22 to a tow plate 21 on the front of the tailbuoy 10.

In the preferred embodiment, positioning signals 24 from satellites 25 (a typical satellite is shown in FIG. 2) are received by antennae 26 mounted on the mast assembly 32 on the tailbuoy 10. After processing the positioning signals 24, tailbuoy location data signals 28 typically are transmitted from the tailbuoy 10 to the control system 18 on the vessel 12.

FIG. 3 is a detailed perspective view of the mast assembly 32 in a vertical deployed position. The components of the mast assembly 32 are made of corrosion-resistant metal to withstand the destructive effects of the salt water environment in which the tailbuoys 10 operate. Other considerations, which are well known by those skilled in the art, for the configuration of the mast assembly 32 are the hydrodynamic aspects for the portion that will be submerged and subjected to the forces of the water as the tailbuoy 10 is pulled through the water and the ability of the tailbuoy 10 to remain in an upright position when the mast assembly 32 is in its upright, operational position.

As shown in FIG. 3, two elongated masts 34 are pivotally mounted on a shaft 36 forming a structure having a front side and a back side. The masts 34 pivot about the shaft 36 in parallel planes. The shaft 36 divides the mast assembly 32 into a top section 39 and a bottom section 40. Two arms 42 are fixedly attached perpendicularly to the front side of the masts 34 in the top section 39. The arms 42 are connected to each other by an arm crosspiece 44. Braces 46 may be attached between the arms 42 and the masts 34 to provide additional support. Two legs 48 are similarly fixedly attached perpendicularly to the back side of the masts 34 in the bottom section 40. A leg crosspiece 50 connects the legs 48 to each other. Braces 46 also can be used to provide additional support between the legs 48 and the masts 34. Antennae 26, for receiving and transmitting signals, are removably mounted on the top ends of the masts 34. This particular embodiment of the mast assembly 32 is meant by way of example and is not meant to limit the scope of the invention.

As shown in FIG. 4, which is a perspective view of the present invention, the preferred embodiment tailbuoy 10 includes a frame assembly (shown as components 30A–F), a mast assembly 32, a rudder assembly 60, floatation saddles 62 and bulkhead floatation tanks 63A–B. In the preferred embodiment, the primary components of the frame assembly are two elongated parallel bars 30A and 30B which extend through the front bulkhead 68A and front bulkhead floatation tank 63A where they are removably attached to the tow plate 21 by bolts or the like and similarly through the rear bulkhead 66B and rear bulkhead floatation tank 63B where they are removeably attached to the rudder assembly 60. Additional elongated bars 30C, 30D, 30E and 30F of frame assembly are fixedly attached to the bulkheads 68A and 68B, as shown in FIGS. 4 and 5, to provide structural support and to provide attachment means for the floatation saddles 62.

An equipment well 64, illustrated in FIG. 5, is formed by some of the components of the tailbuoy 10: the frame assembly components 30A–F, the floatation saddles 62 and the bulkheads 68A–B. To ensure that the drawings are as uncluttered as possible to facilitate the description of the present invention, the communication equipment, power system, electronics, rudder controls and other equipment that typically are located in the equipment well 64 are not illustrated.

To provide the buoyancy necessary for the tailbuoy 10 to float on the surface of the body of water, several floatation components are attached to the frame assembly components 30C–F of the tailbuoy 10. In the preferred embodiment, these floatation components are floatation saddles 62 and bulkhead floatation tanks 63A–B. Multiple floatation saddles 62 are removably attached to the sides of the frame assembly components 30C–F between the front and rear bulkheads 68A and 68B, respectively, as shown in FIGS. 4 and 5. The front bulkhead floatation tank 63A is fixedly attached to the frame assembly components 30A–F between the tow plate 21 and the front bulkhead 68A. Similarly, the rear bulkhead floatation tank 63B is fixedly attached to the frame assembly components 30A–F between the rudder assembly 60 and the rear bulkhead 68B. This configuration of floatation means is meant only as an example and is not meant to limit the scope of the invention.

FIG. 4 illustrates the tailbuoy 10 with the mast assembly 32 in the vertical, deployed position and illustrates the relative positioning of the components of the mast assembly 32 with respect to the frame assembly components 30A–F, the rudder assembly 60 and the floatation saddles 62. Two tailbuoy lifting lugs 66 are part of the bulkheads 68 and are centrally positioned on the top surface of the bulkheads 68, as shown in FIG. 4. These lifting lugs 66 facilitate the deployment and retrieval of the tailbuoy 10 into and from the water. Also illustrated in FIGS. 4 and 5, are stop members 72 which are fixedly attached to the top of the frame assembly components 30C and 30E such that the mast assembly 32 completes its rotation to the vertical, deployed position when the arm crosspiece 44 comes into contact with the stop members 72.

As the tailbuoy 10 is being towed through the water, the water exerts pressure against the front side of the bottom section 40 of the mast assembly 32 forcing the mast assembly 32 to rotate clockwise until the arm crosspiece 44 of the mast assembly 32 contacts the stop members 72, illustrated in FIG. 4, wherein the mast assembly 32 is in its approximately vertical, deployed position.

FIG. 5 is a top view of the tailbuoy 10 with the mast assembly 32 in the horizontal storage position. This view shows the antennae 26 mounted at the top ends of the masts 34. It also illustrates the equipment well 64 formed by the bulkheads 68, the frame assembly components 30A–F and the floatation saddles 62. Roller assemblies 31, located underneath the frame assembly, provide additional structural support for the tail buoy 10 as well as provide a means to roll the tailbuoy 10 into and out of its storage location of the vessel 12, as shown in FIG. 1.

Propeller assemblies 80, as shown in FIGS. 3 and 5, can be mounted on the front side of the bottom section 40 of the mast assembly 32. When the mast assembly 32 is in the vertical, deployed position (FIG. 3), the flow of water through the propeller assemblies 80 generates power which typically is used to operate the electronics equipment carried in the equipment well (FIG. 5) of the tailbuoy 10. The shaft (not shown) of the propeller assembly 80 is connected to a generator (not shown).

When the marine survey is completed, the leadin cables 16, streamer cables 14 and tailbuoys 10 are retrieved from the water and stored on the vessel 12. The leadin cable 16 and the streamer cable 14 are winched onto the reel 20 and disconnected from the tow cable 22. The tow cable 22 is used to bring the tailbuoy 10 to the side or rear of the vessel 12 where equipment (not shown) is removably attached to the lifting lugs 66 (FIG. 4) and the tailbuoy 10 is hoisted onboard the vessel 12. As the tailbuoy 10 is lifted onto the vessel 12, the mast assembly 32 is pivoted counter-clockwise to its horizontal, storage position as shown in FIG. 5. The description of the direction of rotation of the mast assembly 32 is meant by way of example and is not meant to limit the scope of the invention. A holding clamp (not shown) can be placed on the mast assembly 32 to hold the mast assembly 32 in this horizontal, storage position. The tailbuoy 10 then is rolled to its storage location on the vessel 10.

To start marine seismic operations, the reverse procedure is used. The tailbuoy 10 is rolled into its deployment position and connected to the tow cable 22. Hoisting equipment (not shown) is removeably attached to the lifting lugs 66 (FIG. 4). If a holding clamp (not shown) has been placed on the mast assembly 32, the holding clamp is removed to allow the mast assembly to pivot. As the equipment hoists the tailbuoy 10 from the deck of the vessel 12, gravity causes the mast assembly 32 to pivot in a clockwise direction until the masts 34 are approximately vertical. The tailbuoy 10 is placed in the water. The equipment (not shown) is detached from the lifting lugs 66 and the tailbuoy 10 deploys itself behind the vessel 10 as the attached streamer cable 14 is deployed from the vessel 10.

As the tailbuoy 10, connected via the tow cable 22 to the streamer cable 14 and leadin cable 16, is towed behind the vessel, the force of the water against the front side of the bottom section 40 of the mast assembly 32 holds the masts 34 in the desired approximately-vertical, deployed position.

The foregoing description is directed to the preferred embodiment of the present invention and the best modes contemplated for practicing the present invention. It should be understood that the invention is not to be unduly limited to the foregoing which has been set forth for the purpose of illustrative and explanatory purposes. Various modifications and alternatives of the invention will be apparent, however, to one skilled in the art without departing from the true scope of the invention. It is intended that the following claims be interpreted to embrace all such modifications, changes and equivalents.

I claim:

1. A buoy with self-deploying mast assembly, comprising:
   a buoy;
   a frame pivotly coupled to said buoy along a pivot axis, wherein the weight of said frame is distributed with respect to the pivot axis so that a lower end of said frame extends into the water when the buoy is floating on the water and a bottom end of said frame has a surface against which the water exerts a force as the buoy is towed through the water to rotate said frame into a desired position; and
   a stop member attached to said buoy to maintain said frame in the desired position.

2. The buoy with self-deploying mast assembly of claim 1, wherein said frame is adapted to receive at least one antenna and wherein said antenna extends upward from said buoy when said frame is in said desired position.

3. The buoy with self-deploying mast assembly of claim 1, wherein said frame pivots into a second desired position for storage purposes.

4. The buoy with self-deploying mast assembly of claim 1, further comprising:
   a shaft adapted to pivotly mount in a horizontal position on the buoy;
   a pair of masts mounted on said shaft forming a structure having front and back surfaces and top and bottom sections;
   two arms attached perpendicularly to the front surface of the top section of said structure;
   two legs mounted perpendicularly to the back surface of the bottom section of said structure;
   an arm crosspiece attached between said arms; and
   a leg crosspiece attached between said legs.

5. The buoy with self-deploying mast assembly of claim 1, further comprising a power generator, said power generator comprising:
   at least one propeller attached to said surface of said bottom end of said frame; and
   generating means attached to said propeller, wherein said generating means converts the energy created by the rotation of the propeller when the water flows through said propeller as the buoy is towed through the water.

6. The buoy with self-deploying mast assembly of claim 4, further comprising:
   at least one arm brace attached between said arms and said masts; and
   at least one leg brace attached between said legs and said masts.

7. A mast assembly for use on a buoy, wherein said mast assembly comprises:
   a frame adapted to be pivotly coupled to said buoy along a pivot axis, wherein the weight of said frame is distributed with respect to the pivot axis so that a lower end of said frame extends into the water and a bottom end of said frame has a surface against which the water exerts a force to rotate said frame into a desired position; and
   a stop member adapted to be attached to said buoy to maintain said frame in the desired position.

8. The mast assembly of claim 7, wherein said frame is adapted to receive at least one antenna and wherein said antenna extends upward when said frame is in said desired position.

9. The mast assembly of claim 7, wherein said frame pivots into a second desired position for storage purposes.

10. The mast assembly of claim 7, further comprising:
    a shaft;
    a pair of masts mounted pivotally on said shaft forming a structure having front and back surfaces and top and bottom sections;
    two arms attached perpendicularly to the front surface of the top section of said structure;
    two legs mounted perpendicularly to the back surface of the bottom section of said structure;
    an arm crosspiece attached between said arms; and
    a leg crosspiece attached between said legs.

11. The mast assembly of claim 7, further comprising a power generator, said power generator comprising:
    at least one propeller attached to said surface of said bottom end of said frame; and
    generating means attached to said propeller, wherein said generating means converts the energy created by the rotation of the propeller when the water flows through said propeller.

12. The buoy with serf-deploying mast assembly of claim 10, further comprising:
    at least one arm brace attached between said arms and said masts; and
    at least one leg brace attached between said legs and said masts.

* * * * *